Feb. 11, 1969  E. C. WHITNEY  3,427,486

DYNAMOELECTRIC MACHINES USING CERAMIC PERMANENT MAGNETS

Filed June 16, 1966

WITNESSES
Helen M. Farkas
E. Strickland

INVENTOR
Eugene C. Whitney
BY F. R. L.
ATTORNEY

United States Patent Office 3,427,486
Patented Feb. 11, 1969

3,427,486
DYNAMOELECTRIC MACHINES USING CERAMIC PERMANENT MAGNETS
Eugene C. Whitney, Forest Hills, Pittsburgh, Pa., assignor to Westinghouse Electric Corporation, Pittsburgh, Pa., a corporation of Pennsylvania
Filed June 16, 1966, Ser. No. 558,130
U.S. Cl. 310—180    6 Claims
Int. Cl. H02k 1/00, 21/12, 1/22

ABSTRACT OF THE DISCLOSURE

A dynamoelectric machine including a plurality of salient poles radially extending from the rotor hub portion; at least one ceramic permanent magnet supported on each side of said pole and another ceramic permanent magnet secured between the base portion of said pole and the rotor hub portion.

---

Figure 1:
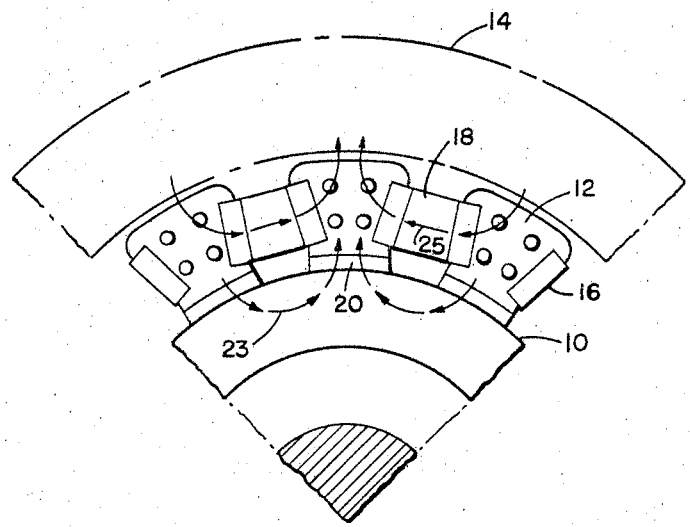

The present invention relates generally to the use of ceramic permanent magnets in direct and alternating current machines and particularly to ceramic magnets as the field producing means on salient poles in such machines.

Presently, metal permanent magnetic materials, such as Alnico, have been used as permanent magnets in dynamoelectric machines. Such magnets have a high permeability for providing ample magnetic flux and accordingly high torque, but lack a high coercive force to insure against the demagnetization of the magnets that can occur in the machine. For example, at the asynchronous start of a synchonous motor, the permanent magnet is subjected to strong demagnetization forces from the main field of the stator or armature. In generators with conventional permanent magnet poles, a short circuit or similar fault can cause high demagnetizing current in the armature with the resultant partial loss of magnetism and armature voltage. The same demagnetizing problem may be present with the rotor removed from the stator. The machine of course is out of service until the poles can be remagnetized.

The present invention overcomes these demagnetization problems associated with metal magnets by the use of ceramic permanent magnets in the field of synchronous, permanent magnet machines. The ceramic magnets used are formed from a low flux density, high coercive force permanent material such as a ferrite ceramic, for example, strontium ferrite ($SrFe_{12}O_{19}$), lead ferrite ($PbFe_{12}O_{19}$) or barium ferrite ($BaFe_{12}O_{19}$) though the invention is not limited thereto. Such magnets can be formed into elongated, curved or rectangularly shaped bars and disposed along the sides of salient steel poles so that each pole has at least two such magnets, extending along its length dimension. Between the body of the pole and the rotor hub on which the pole is attached is disposed another substantially flat ceramic magnet that assists the side magnets in directing flux into a large collecting area in the sides and base of each pole and forces this flux out of the face area of the pole at much higher density in the machine "air gap." Because of the improved magnetic characteristics of such ceramic magnets, shorter magnet lengths in the magnetized direction can be used than with metallic magnets. The ceramic magnetic materials further have a lower specific gravity which provides for further savings in weight and space within the machine. Their high coercive capability is an important advantage when external fields are encountered which would tend to cause an excessive reduction in flux.

It is therefore an object of the present invention to provide a unique and improved dynamoelectric machine having magnetic field properties highly resistant to demagnetization forces in the machine.

Another object of the invention is to provide a permanent magnet rotor for a dynamoelectric machine using ceramic magnets capable of rotating at high speeds without damage to the magnets which are poor in mechanical characteristics except compression.

Still another object of the invention is to provide a unique and improved dynamoelectric machine using ceramic magnets having a high coercive magnetic force and low flux density.

A further object of the invention is to provide an improved large alternating current synchronous machine using ceramic permanent magnets in the field thereof.

Figure 2:
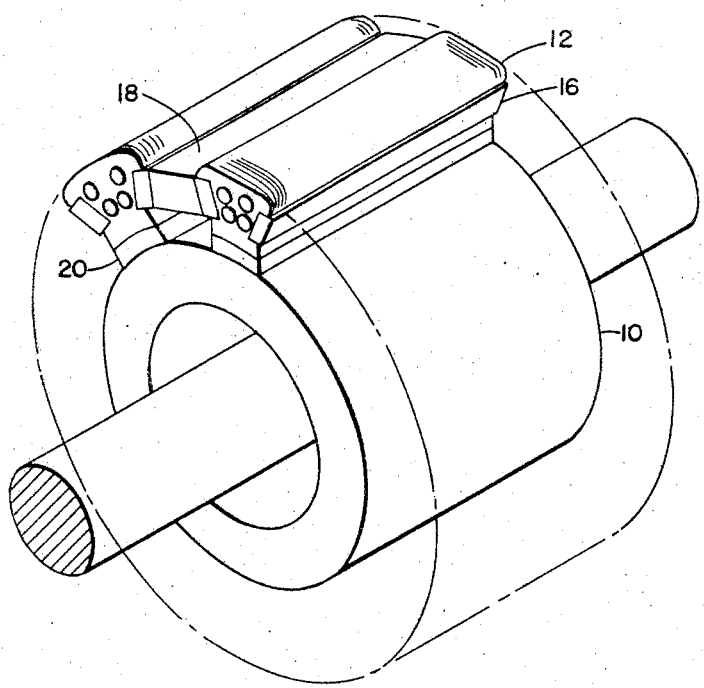

These and other objects of the invention will become more apparent from the following detailed description taken in connection with the accompanying drawing, in which:

FIGURE 1 shows a partial front elevation view of a machine rotor constructed in accordance with the principles of the present invention; and FIG. 2 shows a perspective view of the structure illustrated in FIG. 1.

Specifically, in FIG. 1 there is shown (only representatively) a partial rotor hub portion 10 supporting a plurality of salient pole pieces 12 thereon and in close proximity to stator frame and winding 14 only representatively shown. The salient poles 12 may be made of laminated steel though the invention is not limited thereto. The laminations however reduce pole face losses.

The salient pole structure shown in FIGS. 1 and 2 is representative only. A complete rotor assembly would include a plurality of salient poles 12 disposed in a balanced and well known manner around the rotor hub 10.

Salient poles 12, or their laminations if used, are formed with a cutout portion in both sides thereof for accommodating ceramic permanent magnet members 16. Magnets 16 extend along the length of the poles, as best seen in FIG. 2, and are partially enclosed by the body of the poles including the overhanging edge or lip portions of the pole face. To further firmly position and secure ceramic magnets 16 in place, steel support blocks 18 are disposed between adjacent poles 12, as shown in the figures, in physical contact with the adjacent magnets. Thus, the poles and steel blocks function to securely hold magnets 16 in place when rotor 10 undergoes rotation.

It is well known that ceramic materials tend to have a poor mechanical strength characteristic. In the present invention, this characteristic is compensated for by disposing ceramic magnets 16 on poles 12 in such a manner that the magnets are in compression during operation of the machine. As the rotor 10 rotates, centrifugal forces are developed that radially act upon magnets 16 (along with magnets 20) to compress and thus mechanically strengthen the magnets so that at high rotational speeds they will not rupture or otherwise be damaged or weakened.

In FIGURES 1 and 2, the shank portions of poles 12 are shown tapered for purposes of obtaining a large flux collecting area adjacent the stator. However, the invention is not limited to such a tapered pole design. For example, pole 12 may have a uniform shank with magnets 16 being tapered with an increasing thickness dimension in the direction of the pole face.

To further insure the desired flux density at the pole face, a plurality of ceramic magnets may be used. In the figures, an additional substantially flat ceramic magnet 20 is shown disposed (and secured) between each of the pole bases and rotor hub portion 10 that increases the flux density in the poles as indicated by flux lines 23. Magnetic lines of force (23 and 25) thus concentrate in the shank and face portions of poles 12, as shown in FIG. 1, to provide ample useful flux, i.e., working lines of force extending across the air-gap between salient poles 12 and stator 14.

As mentioned earlier, magnets 16 and 20 are formed from a low flux density, high coercive force ceramic permanent magnetic material such as strontium or lead ferrite. The component elements and method of manufacture of such magnets are described in U.S. Patent No. 3,113,927 issued Dec. 10, 1963 and assigned to the present assignee. The demagnetizing forces inherent in machine use and operation have made the magnetically less stable metal permanent magnets impractical to use, and this is especially so in large permanent magnet generators and synchronous motors where the demagnetizing forces are much greater. High coercive force ceramic magnets, being substantiallly insensitive to demagnetization forces, eliminate the problems caused thereby in permanent magnet machines. Large permanent magnet machines of the salient pole type can particularly make good use of such magnets as evidenced by the present disclosure. Magnetic bars 16 and pads 20 are compact and easily accommodated and held by salient poles 12 as shown. Ceramic magnets 16 and 20 can be made and formed by equipment familiar in the ceramic industry since ceramic magnets have many of the characteristics of other ceramic materials. Thus, the excellent magnetic qualities of such magnets are not detracted by high costs and large size and weight.

Though the invention has been described with particular reference to a rotor, it should be understood that the disclosure is not limited thereto. For example, high coercive force ceramic magnets can have utility on stator pole pieces as on DC machines though such means are not specifically shown in the drawings. Therefore, the invention is not restricted to the specific details shown but includes all equivalent embodiments and modifications.

What is claimed is:

1. A dynamoelectric machine having a stator, and a rotor mounted for rotation relative to said stator, said rotor including a plurality of salient poles with at least one ceramic permanent magnet disposed radially on each side of each pole.

2. The machine of claim 1 in which a third ceramic magnet is disposed between the base of each pole and the rotor.

3. The machine of claim 1 in which the pole structure is provided with a cutout portion along the side thereof for holding the ceramic magnet therein.

4. The machine of claim 1 including a blocking structure disposed between the magnets on adjacent poles.

5. The machine of claim 1 in which the magnets are made from a ceramic ferrite material selected from the group consisting of strontium ferrite, lead ferrite and barium ferrite.

6. A rotor for a dynamoelectric machine comprising at least two salient poles supported on a rotor hub portion, ceramic means disposed on the poles for providing a permanent magnetic field in the poles, said ceramic means made of a permanent magnet ferrite material having a high coercive force and a low flux density.

References Cited

UNITED STATES PATENTS

| | | | |
|---|---|---|---|
| 2,475,776 | 7/1949 | Brainard | 310—156 |
| 2,899,573 | 8/1959 | Wesolowski | 310—60 |
| 3,121,814 | 2/1964 | Kober | 310—156 |
| 3,368,275 | 2/1968 | Eberline | 310—154 |

WARREN E. RAY, *Primary Examiner.*

R. SKUDY, *Assistant Examiner.*

U.S. Cl. X.R.

310—156, 261